(12) United States Patent
Luo et al.

(10) Patent No.: US 9,983,669 B2
(45) Date of Patent: May 29, 2018

(54) SYSTEM FOR TRANSMITTING SIGNALS BETWEEN A BODY OF A LIVING BEING AND A VIRTUAL REALITY SPACE

(71) Applicants: Gangming Luo, Middle Village, NY (US); Jonathan J. Kaufman, Brooklyn, NY (US)

(72) Inventors: Gangming Luo, Middle Village, NY (US); Jonathan J. Kaufman, Brooklyn, NY (US)

(*) Notice: Subject to any disclaimer, the term of this patent is extended or adjusted under 35 U.S.C. 154(b) by 0 days. days.

(21) Appl. No.: 15/203,970

(22) Filed: Jul. 7, 2016

(65) Prior Publication Data
US 2018/0011535 A1    Jan. 11, 2018

(51) Int. Cl.
*G06F 3/01*    (2006.01)

(52) U.S. Cl.
CPC .............. *G06F 3/014* (2013.01); *G06F 3/016* (2013.01); *G06F 3/017* (2013.01)

(58) Field of Classification Search
CPC ........... G06F 3/014; G06F 3/016; G06F 3/017
See application file for complete search history.

(56) References Cited

U.S. PATENT DOCUMENTS

| | | | | |
|---|---|---|---|---|
| 6,042,555 A | * | 3/2000 | Kramer | A61B 5/225 600/595 |
| 6,312,398 B1 | * | 11/2001 | Cencer | B64G 6/00 601/33 |
| 7,862,522 B1 | * | 1/2011 | Barclay | A61B 5/6806 414/2 |
| 2010/0234182 A1 | * | 9/2010 | Hoffman | A61B 5/1125 482/8 |
| 2010/0249675 A1 | * | 9/2010 | Fujimoto | A61H 1/0285 601/40 |
| 2015/0190246 A1 | * | 7/2015 | Ryu | G06F 3/011 74/89.22 |
| 2017/0079560 A1 | * | 3/2017 | Bae | A61B 5/11 |

* cited by examiner

*Primary Examiner* — Lixi C Simpson
(74) *Attorney, Agent, or Firm* — Reising Ethington P.C.

(57) ABSTRACT

A system for transmitting signals between a body of a living being and a virtual reality space includes a mount and a base configured to be affixed to respective first and second bony members of the body on a distal side and a proximal side, respectively, of a joint. An elongate, flexible strip is affixed at a first end to the mount and at a second end to the base. A sensor disposed on the base is configured to generate a displacement signal indicative of displacement of the strip in response to movement of the first bony member relative to the second bony member. The system further includes a display and a controller configured to receive the displacement signal and to control movement of a virtual representation of the body on the display responsive to the displacement signal and feedback of interaction in the virtual space to the living being.

23 Claims, 8 Drawing Sheets

SYSTEM FOR TRANSMITTING SIGNALS BETWEEN A BODY OF A LIVING BEING AND A VIRTUAL REALITY SPACE

BACKGROUND OF THE INVENTION a. Field of the Invention

This invention relates generally to a system for transmitting signals between a body of a living being and a virtual reality space. More specifically, the invention pertains to a system that that translates movements of the body into movements within the virtual space and that generates sensations in the body in response to interactions in the virtual space.

b. Background Art

The use and prevalence of virtual reality systems is continuously increasing. Virtual reality systems are, for example, used in flight simulation, battlefield simulation, medical training and robotic surgery, games and other forms of entertainment. Virtual reality systems provide many benefits including reduced costs as compared to similar real life experience and the ability for users to practice or test various actions without the associated risks of taking those actions in real life. Virtual reality systems, however, can be relatively expensive to implement and are often very complex. The cost and complexity of existing systems often delays the adoption and use of such systems in various fields and/or reduces access to such systems.

The inventors herein have recognized a need for a system for transmitting signals between a body of a living being and a virtual reality space that will overcome one or more of the above-identified deficiencies.

BRIEF SUMMARY OF THE INVENTION

A system for transmitting signals between a body of a living being and a virtual reality space is provided. In particular, a system is provided that translates movements of the body into movements within the virtual space and that generates sensations in the body in response to interactions in the virtual space and does so using technologies that are less complex and less expensive than conventional systems.

A system for transmitting signals between a body of a living being and a virtual reality space in accordance with one embodiment of the invention includes a mount configured to be affixed to a first bony member of the body on a distal side of a joint and a base configured to be affixed to a second bony member of the body on a proximal side of the joint. The system further includes an elongate, flexible strip affixed at a first end to the mount and at a second end to the base. The system further includes a sensor disposed on the base and configured to generate a displacement signal indicative of displacement of the strip in response to movement of the first bony member relative to the second bony member. The system further includes a display and a controller configured to receive the displacement signal and to control movement of a virtual representation of the body on the display responsive to the displacement signal.

A system for transmitting signals between a body of a living being and a virtual reality space in accordance with the present teachings is advantageous relative to conventional systems because the system is capable of translating movement in the body of a living being into movement in the virtual space in a manner that is less complex and less costly than conventional systems.

The foregoing and other aspects, features, details, utilities, and advantages of the present invention will be apparent from reading the following description and claims, and from reviewing the accompanying drawings.

DETAILED DESCRIPTION OF EMBODIMENTS OF THE INVENTION

Figure 1:
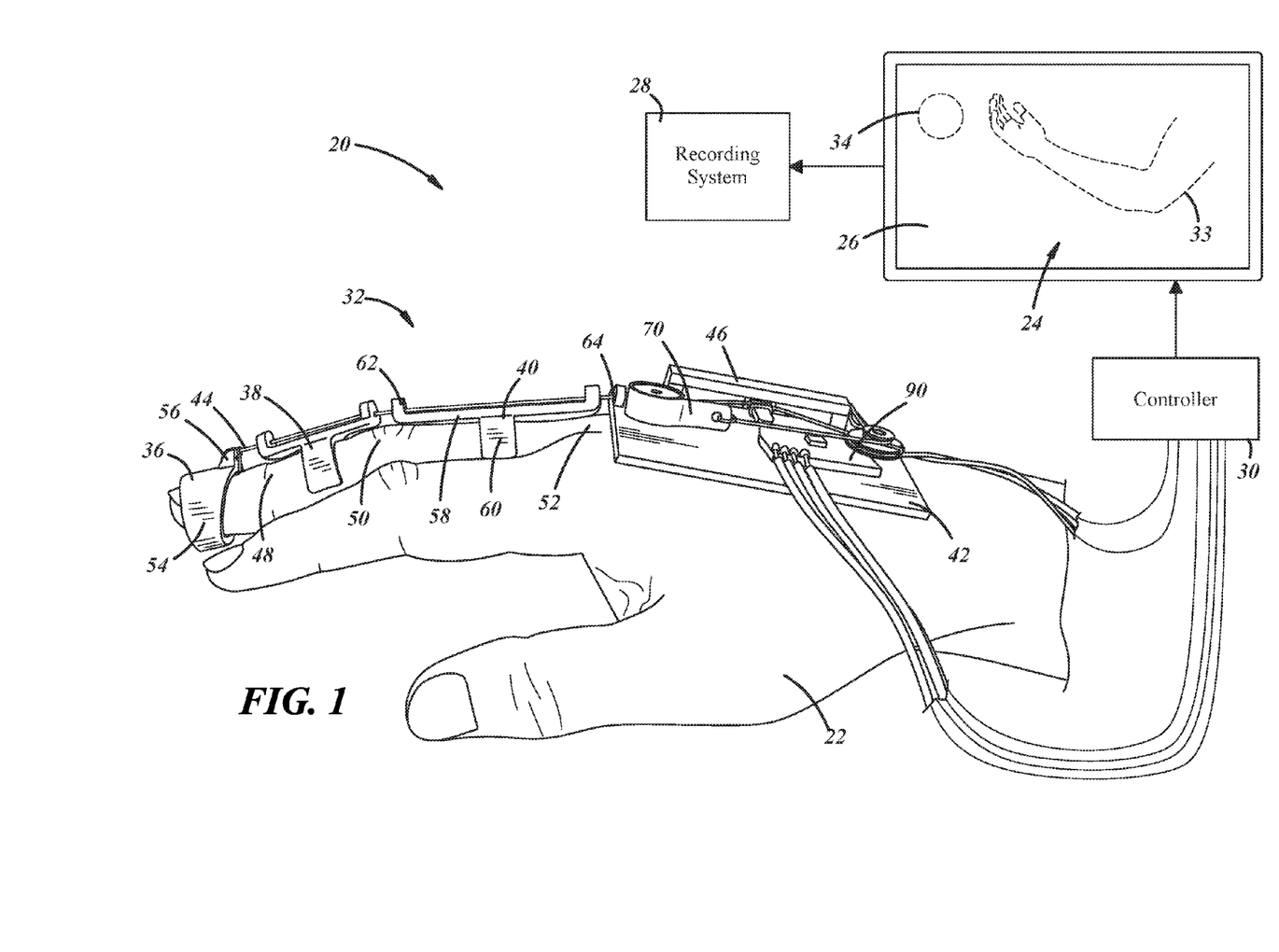
FIGS. 1-2 are diagrammatic views of a system for transmitting signals between a body of a living being and a virtual reality space in accordance with one embodiment of the present teachings.

Referring now to the drawings wherein like reference numerals are used to identify identical components in the various views, FIG. 1 illustrates one embodiment of a system 20 for transmitting signals between a body 22 of a living being and a virtual reality space 24. The system 20 may include a display 26, a recording system 28, a controller 30 and an interface 32 between the controller 30 and the body 22.

Display 26 is provided to display a virtual reality space 24 including virtual representations of bodies 33 and/or parts of bodies and objects 34. Display 26 allows a user to visualize movement of virtual representations of bodies 33 and objects 34 in response to commands from the user and in response to interactions among multiple bodies, multiple objects, and/or between bodies and objects in the virtual reality space 24. Display 26 may comprise a three-dimensional display. Display 26 may be a stereoscopic display or an auto-stereoscopic display. In one embodiment of the system stereoscopic 3D visualization of virtual bodies 33 and objects 34 is achieved by using the Alienware OptX™ AW2310 23-inch 3D Full HD Widescreen Monitor and NVIDIA GeForce 3D Vision Kit (both are available from Dell Computer, 1 Dell Way Round Rock, Tex.) with a 3D graphics card PNY NVIDIA Quadro FX 580 (available from Amazon.com). Controller 30 uses the application programming interface OpenGL originally developed by Silicon Graphics, Inc. to generate images of bodies 33 and objects 34 for left and right eyes and uses display 26 to achieve the stereoscopic 3D visualization. The virtual bodies 33 and objects 34 will be rendered in real-time on display 26. The stereoscopic 3D display 26 will provide realistic visual sense and will improve the usage of system 20.

Recording system 28 is provided to record the positions of the virtual bodies 33 and objects 34 as well as the set of commands received from a user, at any given set of times. A set of images of the virtual bodies 33 and virtual objects 34 can be regenerated using the recorded positions of the virtual bodies 33 and virtual objects 34, for subsequent replaying on display 26 and/or computations or other outputs of controller 30 for use in, for example, performance analysis. System 28 may comprise conventional fixed or portable media (e.g., a hard drive, compact disc, digital video disc, flash drive, etc.) and may be located locally or remotely and accessed over a wired or wireless telecommunications network. System 28 is configured to save and replay all movements of bodies 33 and objects 34 for performance analysis.

Controller 30 provides a means for generating virtual bodies 33 and virtual objects 34 on display 26 and for controlling movement of bodies 33 and objects 34 in response to commands from interface 32 and interactions between the virtual bodies 33 and objects 34 in the virtual reality space 24. Controller 30 further provides a means for generating control signals for one or more components of interface 32 described below in order to cause various sensations in body 22 intended to reflect interactions in the virtual reality space 24. Controller 30 may comprise a programmable microprocessor or microcontroller or may comprise an application specific integrated circuit (ASIC). Controller 30 may include a central processing unit (CPU) and an input/output (I/O) interface through which controller 30 may receive a plurality of input signals including signals generated by interface 32 responsive to movement of body 22 and generate a plurality of output signals including those used to control and/or provide data to display 26 and recording system 28 and to control interface 32 to cause sensations in body 22.

Interface 32 provides a means for detecting movements of body 22. Interface 32 also provides a means for creating sensations in body 22 in response to signals from controller 30. Interface 32 may include a mount 36, one or more guides 38, 40, a base 42, an elongate, flexible strip 44 extending between the mount 36 and base 42 and a sensor 46.

Mount 36 provides one end point for strip 44. Mount 36 may be made from metals, metal alloys or plastics. Mount 36 is configured to be affixed to a bony member and is disposed on one side of a joint relative to base 42. In the illustrated embodiment, the bony member comprises a distal phalanx of a finger and mount 36 is disposed on a distal side of several diarthrosis joints including interphalangeal joints 48, 50 between the distal and middle phalanges of a finger and between the middle and proximal phalanges of the finger, respectively, and metacarpophalangeal joint 52 between the proximal phalanx and a metacarpal and other bones of the metacarpus and carpus. It should be understood, however, that mount 36 could alternatively be mounted on the intermediate or proximal phalanges such that mount 36 is on the distal side of one or more of joints 50, 52 relative to base 42. Mount 36 includes a ring-shaped body 54 configured to be disposed about the distal phalanx. It should be understood, however, that the size, shape and orientation of body 54 may vary depending on the bony member on which mount 36 is disposed. Mount 36 also includes a post 56, hook or similar structure to which one end of strip 44 may be joined to mount 36 directly by wrapping and/or tying the end of the strip 44 to post 56 or indirectly by using adhesives or another fastener to affix the end of the strip 44 to post 56. Post 56 may be affixed to body 54 by adhesives, welds or other fasteners. Alternatively, body 54 and post 56 may be formed together as a unitary (one-piece) body.

Guides 38, 40 are provided to route strip 44 between mount 36 and base 42 and, in particular, over intermediate joints when mount 36 and base 42 are separated by multiple aligned joints. In the illustrated embodiment, guides 38, 40 are both disposed between mount 36 and base 42 and are configured to be affixed to a middle phalanx and a proximal phalanx of a finger, respectively, between the distal phalanx of the finger and a metacarpal. Guide 38 is therefore disposed on a proximal side of joint 48 and a distal side of joints 50, 52. Guide 40 is disposed on a proximal side of joints 48, 50, and a distal side of joint 52. It should be understood that one or both of guides 38, 40 would be eliminated if mount 36 were affixed to the middle or proximal phalanges, respectively, as opposed to a distal phalanx as in the illustrated embodiment. Guides 38, 40 may be made from metals, metal alloys or plastics. Guides 38, 40 may each include a flat, substantially rectangular body 58 configured to extend longitudinally along a corresponding phalanx. The body 58 may have rounded corners. A pair of arcuate arms 60 may extend from one side of body 58 and be configured to partially surround the corresponding phalanx. Arms 60 may be disposed intermediate the longitudinal ends of body 58 and may be disposed at a center point between the two ends. It should again be understood, however, that the size, shape and orientation of guides 38, 40 may vary depending on the bony members on which guides 38, 40 are disposed. A pair of rings 62 may be mounted to the opposite side of body 58 proximate or at each longitudinal end of body 58. Strip 44 may be threaded through each ring 62 such that the alignment of strip 44 relative to the corresponding phalanx and joints is maintained. Arms 60 and rings 62 may be affixed to body 58 by adhesives, welds or other fasteners. Alternatively, body 58, arms 60 and rings 62 may be formed together as a unitary (one-piece) body.

Base 42 provides a second end point for strip 44 and is also configured to support sensor 46. Base 42 may further be configured to support various structures for guiding strip 44 and/or controlling movement of strip 44 to impart sensations to body 22 as discussed in greater detail below. Base 42 is configured to be affixed to a bony member of body 22 on the proximal side of a joint relative to mount 36. In the illustrated embodiment, base 42 is configured to be mounted on the back or upper side of the hand and supported on one or more bony members of the metacarpus and/or carpus. Base 42 is therefore disposed on the proximal side of each of joints 48, 50, 52 relative to mount 36. Although mount 36, guides 38, 40 and base 42 are disposed on the back or upper side of the fingers and hand in the illustrated embodiment, mount 36, guides 38, 40 and base 42 could alternatively be disposed on the front or lower side of the fingers and hand such that base 42 is mounted to the palm of the hand. Base 42 has a substantially flat, rectangular body in the illustrated embodiment that may be secured to the hand in various ways such as adhesive tape or a strap that surrounds the base 42 and hand. It should again be understood, however, that the size, shape, and orientation of the base 42 may vary depending on the bony member to which base 42 is affixed and various design considerations such as the comfort of the user. Base 42 may include a ring 64 proximate or at an edge of base 42 through which strip 44 extends in order to align strip 44 relative to guides 38, 40 and/or mount 36. Ring 64 may be affixed to base 42 by adhesives, welds or other fasteners or may be formed together with base 42 as a unitary (one-piece) body.

Figure 2:
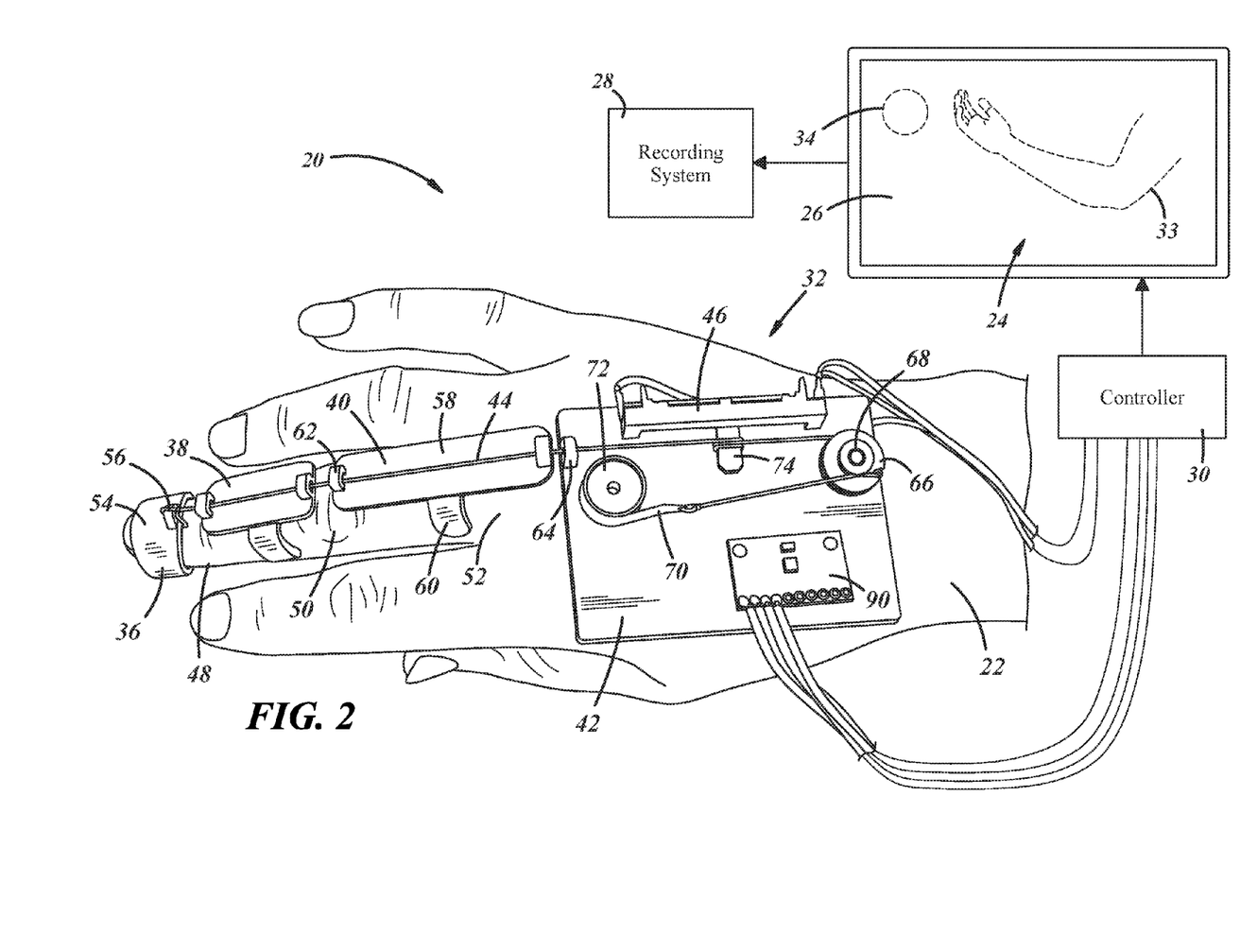
Figure 3A:
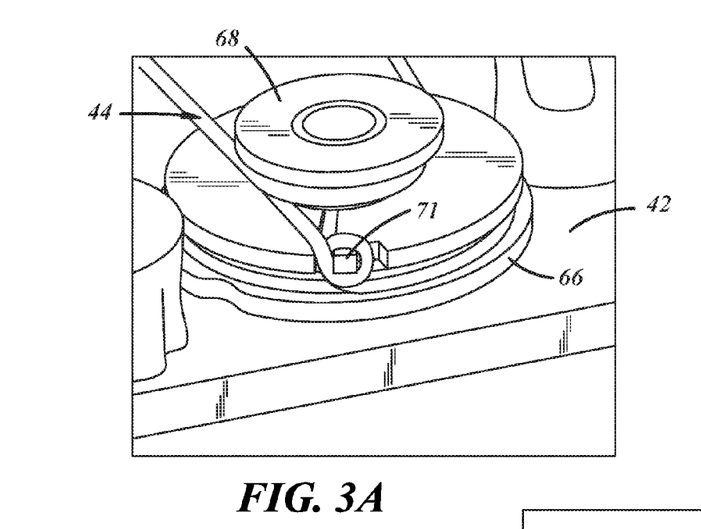
FIGS. 3A-B are perspective views of a portion of the system of FIGS. 1-2.
Figure 3B:
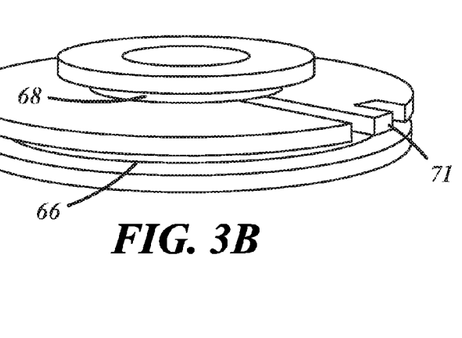

Referring to FIG. 2, in the illustrated embodiment base 42 further includes a pair of pulleys 66, 68 about which strip 44 may be wound in order to change the direction of strip 44 and tension of strip 44. By changing the ratio of pulleys 66, 68, the tension and displacement of strip 44 can be altered to make the design more flexible. For example, a 2:1 ratio of pulleys 66, 68 will double the tension on the spring side and halve the displacement thereby reducing the space required between the pulleys 66, 68 and a spring 70 mounted on base 42 and to which one end of strip 44 is coupled. Pulleys 66, 68 may be coaxially mounted on a post extending from base 42 and may be formed a unitary or one-piece structure. In the illustrated embodiment, pulley 66 has a larger diameter than pulley 68 and is disposed nearer to the surface of base 42 than pulley 68. Referring to FIGS. 3A-B, strip 44 may be wound about pulley 66 one or more times and then about a radially outwardly extending pin 71 formed in a common sidewall of pulleys 66, 68 before passing through an opening in the sidewall and winding about pulley 68 one or more times. Pulleys 66, 68 may be disposed proximate an opposite end of base 42 relative to ring 64 and, in particular an end of base 42 that is distant from joint 52. Referring again to FIGS. 1-2, spring 70 may comprise a constant force spring that is coiled on a drum 72 mounted on a post extending upward from base 42. The spring 70 may be formed from stainless steel strip and may comprise the spring offered for sale by Lee Spring Co. of Brooklyn, N.Y. under Model No. LCF 250 04 025S.

Strip 44 is provided for use in indicating movement of one bony member on one side of a joint relative to another bony member on the opposite side of the joint. Strip 44 is elongate and extends longitudinally from mount 36 at one end to base 42 at an opposite end. Strip 44 is also flexible to permit flexure of strip 44 during relative movement of the bony members about the joint. Strip 44 may comprise a string, rope, wire or cable.

Sensor 46 is provided to measure the displacement of strip 44 as a result of relative movement of the bony members on opposite sides of a joint. Sensor 46 is disposed on base 42 and is configured to generate a displacement signal indicative of the amount of displacement of strip 44. In the embodiment illustrated in FIGS. 1-2, sensor 46 comprises a slide potentiometer and may comprise the slide potentiometer offered for sale by BI Technologies Corporation of Fullerton, Calif. under Model No. PS30-10PB10BR10K. Referring to FIG. 2, a slide 74 of the slide potentiometer is attached to strip 44 by, for example, wrapping strip 44 around slide 74 or fastening strip 44 to slide 74. Movement of the distal phalanx toward the palm of the hand by bending the finger will cause mount 36 to pull strip 44 and increase the tension force on the strip 44, overcoming friction forces and the spring force from spring 70 and moving slide 74 forward toward joint 52. Movement of the distal phalanx away from the palm of the hand by straightening the finger will reduce the tension force on strip 44 and the force of spring 70 will cause slide 74 to move rearward away from joint 52. As noted above, mount 36 and base 42 (and guides 38, 40), could alternatively be mounted on the front or bottom side of the hand. In this case, movement of the distal phalanx toward the palm of the hand by bending the finger would reduce the tension force on strip 44 and the force of spring 70 would cause slide 74 to move rearward away from joint 52 while movement of the distal phalanx away from the palm of the hand by straightening the finger would increase the tension force on strip 44, overcoming friction forces and the spring force from spring 70 and moving slide 74 forward toward joint 52. Movement of slide 74 will cause a change in resistance within the slide potentiometer and the measure resistance will be indicative of the position of one bony member (in this case the distal phalanx) relative to another bony member (in this case one of the metacarpals or other bones of the metacarpus and carpus). The displacement signal generated by sensor 46 is output to controller 30 which generates control signals for display 26 in response to the displacement signal in order to generate a corresponding movement of virtual body 33 on display 26.

Figure 4:
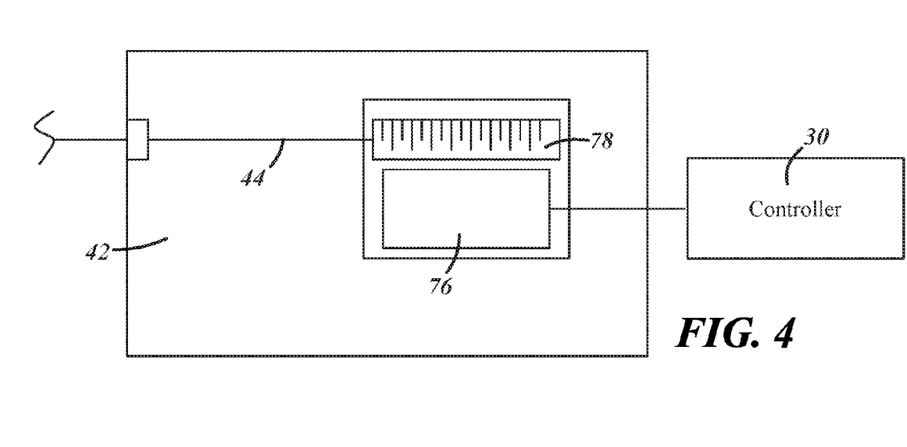
FIG. 4 is a diagrammatic view of a portion of a system for transmitting signals between a body of a living being and a virtual reality space in accordance with another embodiment of the present teachings.
Figure 5:
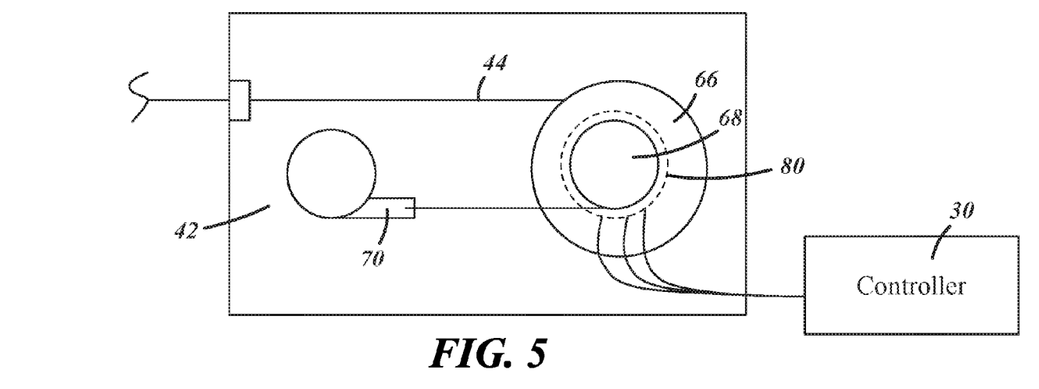
FIG. 5 is a diagrammatic view of a portion of a system for transmitting signals between a body of a living being and a virtual reality space in accordance with another embodiment of the present teachings.
Figure 6:
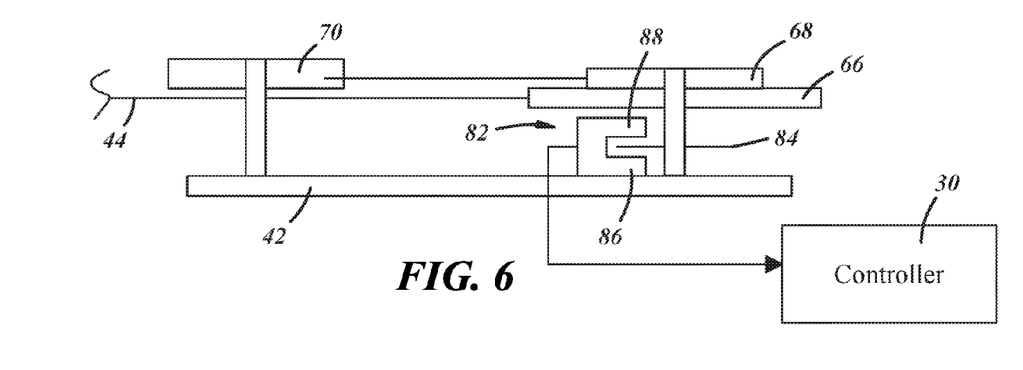
FIG. 6 is a diagrammatic view of a portion of a system for transmitting signals between a body of a living being and a virtual reality space in accordance with another embodiment of the present teachings.

Although a slide potentiometer is used in the embodiment of FIGS. 1-2, other sensors could be used in place of the slide potentiometer. Referring to FIG. 4, in another embodiment, the sensor comprises a linear encoder 76 and may comprise the linear encoder offered for sale by U.S. Digital of Vancouver, Wash. under model number PES-250-2. Movement of the strip 44 will cause corresponding movement of a scale 78 that is formed in the strip 44 itself or is attached to the strip 44. Movement of the scale 78 will be read by the encoder 76 which will generate a displacement signal and output that signal to controller 30. Referring to FIG. 5, in another embodiment, the sensor comprise a rotary potentiometer 80 and may comprise the rotary potentiometer offered for sale by BI Technologies Corporation of Fullerton, Calif. under Model No. P160KN-0QC15B20K. A wiper (not shown) of the rotary pontentiometer 80 is coupled for rotation with pulleys 66, 68. Displacement of strip 44 causes rotation of pulleys 66, 68 and a corresponding change in resistance with the rotary potentiometer 80 which outputs a displacement signal to indicative of movement of strip 44 to controller 30. Referring to FIG. 6, in yet another embodiment, the sensor may comprise a rotary encoder 82 and may comprise the rotary encoder offered for sale by U.S. Digital of Vancouver, Wash. under model number E5 that measures rotation of the pulleys 66, 68, resulting from displacement of strip 44. The rotary encoder 82 may include a disc 84 configured for rotation with pulleys 66, 68. The disc 84 includes a plurality of equally spaced apertures configured to allow light from a light source 86 (e.g., a light emitting diode) to periodically reach a light receiver 88 (e.g., a photodiode) to indicate a degree of rotation of pulleys 66, 68 and, therefore, displacement of strip 44.

In addition to detecting relative movement of bony members about an individual joint, interface 32 may include additional elements intended to detect other movements of body 22. Referring again to FIGS. 1-2, interface 32 may include a motion sensor 90 affixed to base 42 (or, alternatively, to mount 36 or one of guides 38, 40) that is configured to detect movement of the body 22 in various degrees of freedom. In one constructed embodiment, motion sensor 90 comprises a nine degree of freedom motion sensor including an accelerometer, gyroscope and compass offered for sale by InvenSense Inc. of San Jose, Calif. under model number MPU-9250. Motion sensor 90 outputs motion signals to controller 30 responsive to movement of the body 22 in various degrees of freedom and controller 30 may use the motion signals and displacement signal from sensor 46 to generate a complete set of information on movement of a finger relative to a global coordinate system (e.g., earth ground).

Figure 7:
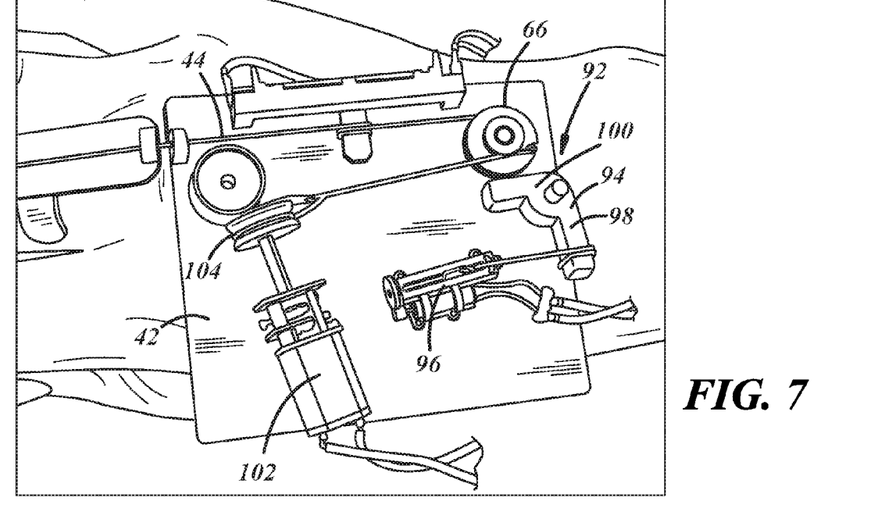
FIG. 7 is a perspective view of a portion of a system for transmitting signals between a body of a living being and a virtual reality space in accordance with another embodiment of the present teachings.

Interface 32 may further include additional elements that that can be used to provide feedback to a user based on actions and interactions in the virtual reality space 24. These elements create sensations in body 22 in response to actions and interactions in the virtual reality space 24 and may be controlled by control signals generated by controller 30. Referring to FIG. 7, in one embodiment a brake 92 is configured to restrict displacement of strip 44 in order to provide a sense of resistance to movement such as when the virtual body 33 contacts a virtual object 34 in the virtual reality space 24. Brake 92 may be mounted on base 42 and configured to inhibit rotation of pulleys 66, 68. In the illustrated embodiment, brake 92 includes a brake body 94 and a linear actuator 96. Body 94 is substantially L-shaped and is configured to pivot about a rotational axis that is parallel to the rotational axis of pulleys 66, 68 and is disposed at the intersection of legs 98, 100. One leg 98 is coupled to a rod extending from linear actuator 96 while the other leg 100 is configured for selective engagement with a radially outer surface of pulley 66. In response to control signals from controller 30, actuator 96 adjusts the position of the rod which causes rotation of body 94 in order to engage or disengage brake 92. In one constructed embodiment, linear actuator 96 comprises the linear actuator offered for sale by Horizon Hobby LLC under model number SPM6832.

Figure 8:
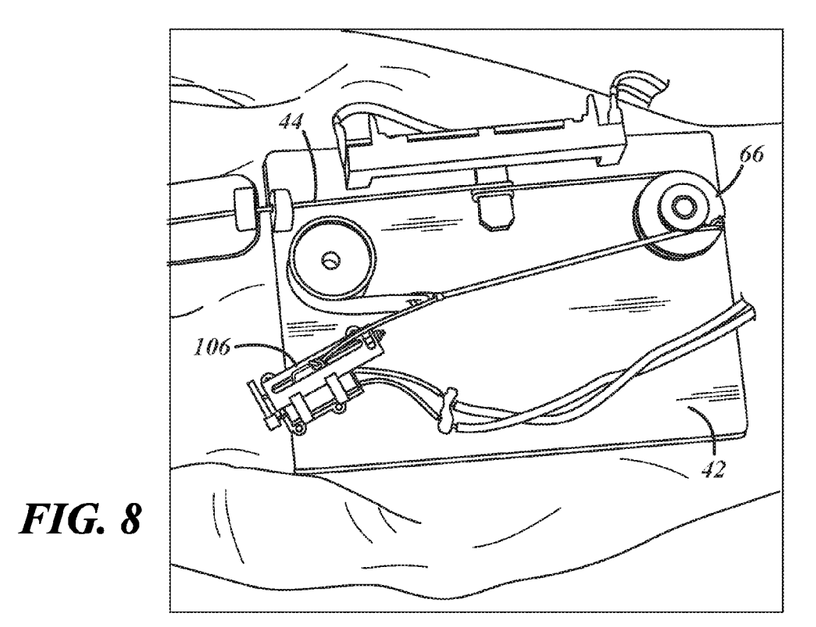
FIG. 8 is a perspective view of a portion of a system for transmitting signals between a body of a living being and a virtual reality space in accordance with another embodiment of the present teachings.

Interface 32 may also include elements that are configured to cause displacement of strip 44 in order to provide a sensation of a force acting on the body 22 when the virtual body 33 in the virtual reality space 24 is impacted by a force from a virtual object 34 or another virtual body 33. In one embodiment, a motor 102 may be configured to cause rotation of pulleys 66, 68 in order to reduce the available length of strip 44 (which, in the illustrated embodiment, will tend to straighten the finger). Motor 102 may be mounted on base 42 and may be configured to control rotation of an additional pulley 104 distal to pulleys 66, 68 (relative to strip 44) and about which a portion of strip 44 is wound. Alternatively, motor 102 may act directly on pulleys 66, 68. Motor 102 may comprise a DC motor and, in one constructed embodiment, comprises a 6/12V speed reduction or gearmotor. Motor 102 may include a torque limiter to control the maximum amount of force delivered to strip 44 (and therefore body 22) by motor 102. Referring to FIG. 8, in another embodiment, a linear actuator 106 may be mounted on base 42 and coupled to one end of strip 44 (the end of the strip 44 may be split with a portion affixed to spring 70 and a portion affixed to the moving part of actuator 106). Movement of the linear actuator 106 responsive to control signals from controller 30 will cause displacement of strip 44 (which, in the illustrated embodiment, may be used to straighten the finger when the rod of the actuator retracts). In one constructed embodiment, linear actuator 106 again comprises the linear actuator offered for sale by Horizon Hobby LLC under model number SPM6832.

Figure 9:
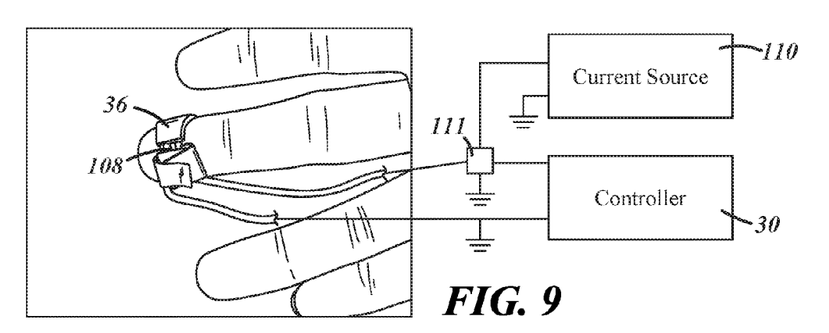
FIG. 9 is a diagrammatic view of a portion of a system for transmitting signals between a body of a living being and a virtual reality space in accordance with another embodiment of the present teachings.
Figure 10:
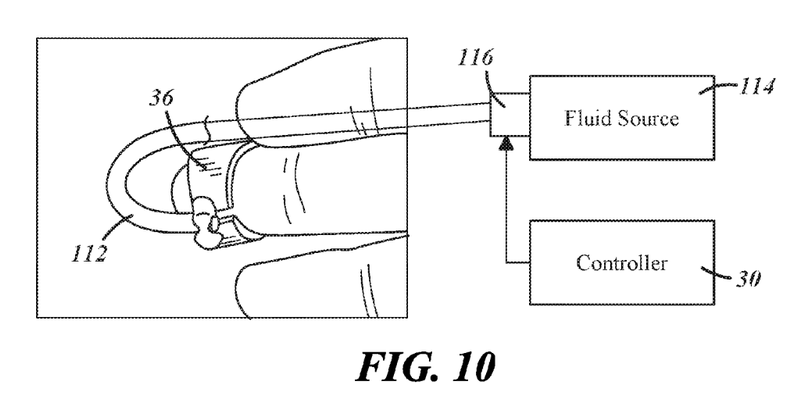
FIG. 10 is a diagrammatic view of a portion of a system for transmitting signals between a body of a living being and a virtual reality space in accordance with another embodiment of the present teachings.

Interface 32 may also include elements configured to provide a sensation of heat or cold to body 22 in order to simulate a hot or cold environment in the virtual reality space 24 and/or contact with a hot or cold body or object in the virtual reality space 24. Referring to FIG. 9, in one embodiment, a resistor 108 may be coupled to mount 36 or another portion of interface 32 and used to deliver heat to a surface of body 22. Controller 30 may generate control signals used to control delivery of current from a current source 110 such as a battery in order to selectively apply heat to a surface of body 22. Controller 30 may output the control signals to a device 111 to control the current delivered by current source 110 to electrode 118. In one embodiment, device 111 may comprise a transistor and, in particular, a MOSFET offered by sale by STMicroelectronics, Inc. of Coppell, Tex. under part number STN2NF10. Referring to FIG. 10, in another embodiment a fluid conduit 112 may be coupled to mount 36 or another portion of interface 32 and configured to deliver fluid from a fluid source 114 at one end of the conduit to a fluid outlet at the other end of conduit 112 disposed proximate a skin surface. The fluid source 114 may, for example, comprise a tank for storage of liquid carbon dioxide. Controller 30 may generate fluid delivery control signals used to control operation of a valve 116 disposed between the fluid source 114 and fluid outlet and thereby control delivery of carbon dioxide to a surface of body 22 to simulate cold. In some embodiments, interface 32 may include a covering (e.g., a glove in the case of a hand) into which the fluid conduit extends in order to maintain the desired temperature at the desired location and/or distribute the temperature sensation over a wider area.

Figure 11:
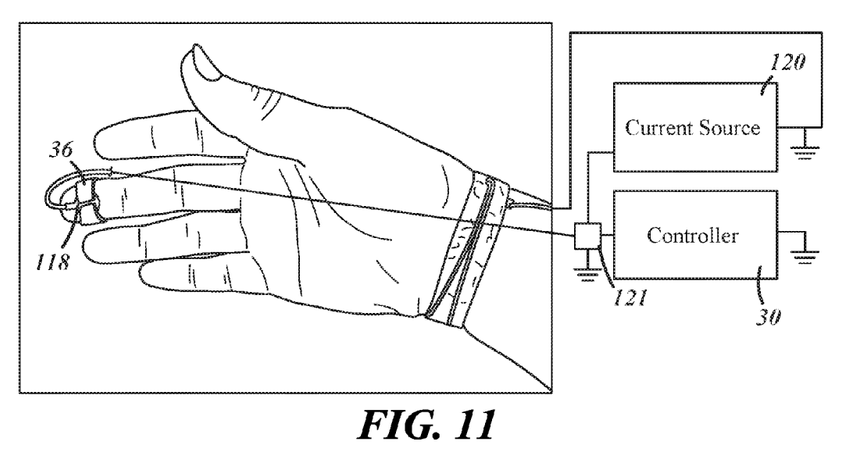
FIG. 11 is a diagrammatic view of a portion of a system for transmitting signals between a body of a living being and a virtual reality space in accordance with another embodiment of the present teachings.
Figure 12:
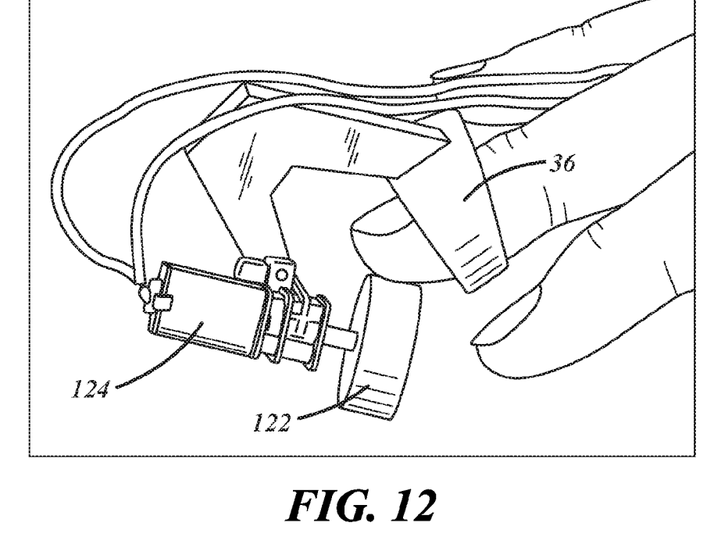
FIG. 12 is a perspective view of a portion of a system for transmitting signals between a body of a living being and a virtual reality space in accordance with another embodiment of the present teachings.
Figure 13:
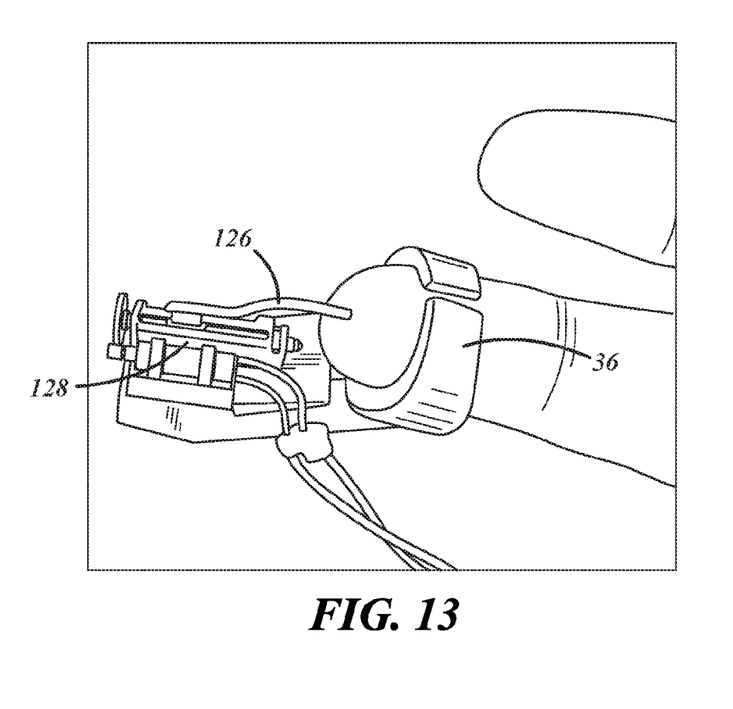
FIG. 13 is a perspective view of a portion of a system for transmitting signals between a body of a living being and a virtual reality space in accordance with another embodiment of the present teachings.

Interface 32 may include still other elements configured to provide a variety of sensations to the skin surface. In addition to providing certain temperature sensations, fluid conduit 112 may be configured to deliver water or another liquid to the skin surface in order to simulate contact with various liquids. Referring to FIG. 11, in another embodiment, an electrode 118 may be coupled to mount 36 or another portion of interface 32 and used to deliver an electric shock to body 22. Controller 30 may generate control signals used to control delivery of current from a current source 120 such as a battery in order to selectively deliver current into body 22 through electrode 118. Controller 30 may output the control signals to a device 121 to control the current delivered by current source 120 to electrode 118. In one embodiment, device 121 may comprise a transistor and, in particular, a MOSFET offered by sale by STMicroelectronics, Inc. of Coppell, Tex. under part number STN2NF10. Referring to FIG. 12, in another embodiment a wheel 122 having a strip of material having predetermined texture characteristics and a motor 124 for driving the wheel 122 may be mounted on mount 36 or another portion of interface 32 in order to simulate contact in the virtual reality space 24 between the virtual body 33 and objects 34 of various textures. Controller 30 may generate control signals used to control motor 124 and rotate wheel 122 responsive to contact between the virtual body 33 and a virtual object 34 in the virtual reality space 24. Referring to FIG. 13, in another embodiment a pin or needle 126 and a linear actuator 128 for causing movement of the needle 126 towards and away from the skin surface may be mounted on mount 36 or another portion of interface 32 in order to simulate contact in the virtual reality space 24 between the virtual body 33 and a virtual object 34 that is configured to be sharp. Controller 30 may generate control signals used to control linear actuator 128 responsive to contact between the virtual body 33 and a sharp virtual object 34 in the virtual reality space 24.

Figure 14:
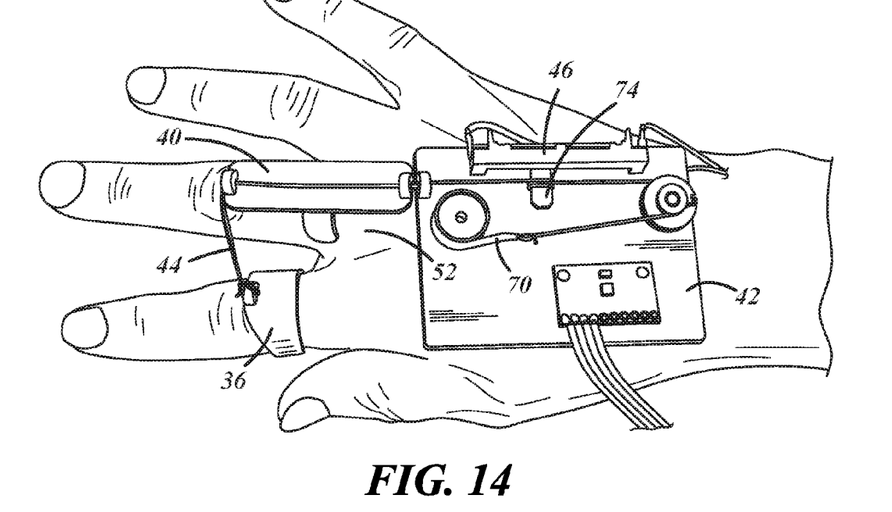
FIG. 14 is a perspective view of a system for transmitting signals between a body of a living being and a virtual reality space in accordance with another embodiment of the present teachings.

In the embodiment of system 20 illustrated in FIGS. 1-2, movement of a distal phalanx relative to middle and proximal phalanges and relative to a metacarpal or other bones of the metacarpus and carpus is detected as a finger is bent towards and away from the palm of the hand. Referring to FIG. 14, in another embodiment, system 20 is used to detect movement of a phalanx of one finger relative to a phalanx on another finger as the fingers separate from one another. In the illustrated embodiment, mount 36 is disposed on a proximal phalanx of one finger while guide 40 is disposed on a proximal phalanx of an adjacent finger. Strip 44 extends from base 42 through guide 40 to mount 36 on the adjacent finger. Separation of the fingers will result in displacement of strip 44 and increase the tension force on strip 44, overcoming friction forces and the spring force from spring 70 and moving slide 74 of sensor 46 forward toward joint 52. Moving the fingers towards one another will reduce the tension force on strip 44 and the force of spring 70 will cause slide 74 to move rearward away from joint 52. It should of course be understood that any of linear encoder 76, rotary potentiometer 80 or rotary encoder 82 described above could be used in place of the slide potentiometer used as sensor 46 in the illustrated embodiment. It should also be understood that many of the additional elements of interface 32 used to detect movement or provide sensations to body 22 will act in a similar manner as described above. In the case of brake 92, brake 92 will restrict displacement of strip 44 in order to provide a sense of resistance to separation of the fingers. Motor 102 and linear actuator 106 will cause displacement of strip 44 in order to provide a sensation of a force acting on the fingers to bring the fingers together.

Figure 15:
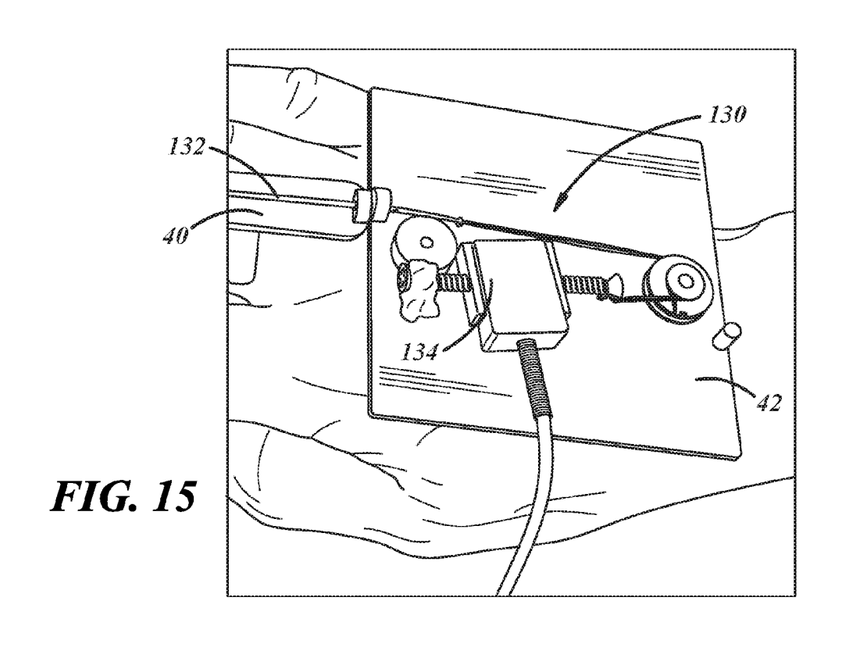
FIG. 15 is a perspective view of a portion of a system for transmitting signals between a body of a living being and a virtual reality space in accordance with another embodiment of the present teachings.

Referring now to FIG. 15, an interface 130 in accordance with another embodiment of the present teachings is illustrated. Interface 130 may be substantially similar to interface 32 and reference may be had above for a description of like components such as mount 36 and guides 38, 40. Interface 130 differs from interface 32 in the composition of strip 132 and sensor 134. In the embodiments of interface 32 described above, the strip 44 had a constant length and was biased to a standard position by the tension applied by spring 70. In interface 130, at least a portion of strip 132 is made from an elastically deformable material such as rubber such that the length of strip 132 may vary and the tension on strip 132 may be increased or decreased as strip 132 is deformed and then returns to its normal state. Sensor 134 comprises a force sensor such as a strain gauge that generates an output signal indicative of the change in tension in strip 132 and, therefore, displacement of one bony member relative to another. In one embodiment, sensor 134 may comprise the force sensor offered for sale by Anyload Transducer Co. Ltd. of Burnaby, British Columbia, Canada under the model number and name 101NH S-Beam Load Cell.

A system for transmitting signals between a body of a living being and a virtual reality space in accordance with the present teachings is advantageous relative to conventional systems because the system is capable of translating movement in the body of a living being into movement in the virtual space in a manner that is less complex and less costly than conventional systems.

While the invention has been shown and described with reference to one or more particular embodiments thereof, it will be understood by those of skill in the art that various changes and modifications can be made without departing from the spirit and scope of the invention.

We claim:

1. A system for transmitting signals between a body of a living being and a virtual reality space, comprising:
   a mount configured to be affixed to a first bony member of the body on a distal side of a first joint;
   a base configured to be affixed to a second bony member of the body on a proximal side of the first joint;
   an elongate, flexible strip affixed at a first end to the mount and at a second end to the base;
   a first pulley mounted on the base, the strip would about the first pulley;
   a sensor disposed on the base and configured to generate a displacement signal indicative of displacement of the strip in response to movement of the first bony member relative to the second bony member, wherein the sensor comprises a slide potentiometer having a slide coupled to the strip;
   a display; and,
   a controller configured to receive the displacement signal and to control movement of a virtual representation of the body on the display responsive to the displacement signal.

2. The system of claim 1, further comprising a first guide disposed between the mount and the base and through which the strip extends, the first guide configured to be affixed to a third bony member of the body that is disposed on the distal side of the first joint and on a proximal side of a second joint, the first bony member disposed on a distal side of the second joint.

3. The system of claim 2, further comprising a second guide disposed between the first guide and the mount and through which the strip extends, the second guide configured to be affixed to a fourth bony member of the body that is disposed on the distal side of the second joint and on a proximal side of a third joint, the first bony member disposed on a distal side of the third joint.

4. The system of claim 1 wherein the joint comprises a diarthrosis joint.

5. The system of claim 1 wherein the first bony member comprises a distal phalanx.

6. The system of claim 1 wherein the first bony member comprises a middle phalanx.

7. The system of claim 1 wherein the first bony member comprises a proximal phalanx.

8. The system of claim 1, further comprising a first guide through which the strip extends, the first guide configured to be affixed to a third bony member of the body wherein the first and third bony members comprise phalanges on adjacent fingers of a hand and the displacement signal is indicative of relative movement of the adjacent fingers.

9. The system of claim 1, further comprising a spring supported on the base, the second end of the strip affixed to the spring.

10. The system of claim 1, further comprising a linear actuator disposed on the base and coupled to the second of the strip, the controller configured to generate a control signal that causes movement of the linear actuator and displacement of the strip.

11. The system of claim 1, further comprising a resistor coupled to one of the mount and the base, the controller configured to generate a control signal to provide current to the resistor and generate heat.

12. The system of claim 1, further comprising a fluid conduit coupled to one of the mount and the base and configured to deliver fluid from a fluid source at one end of the conduit to a fluid outlet at another end of the conduit, the controller configured to generate a fluid delivery control signal to control operation of a valve between the fluid source and the fluid outlet.

13. The system of claim 1, further comprising a motor supported on the mount and a wheel configured to be rotated by the motor, the wheel having a material disposed thereon with a predetermined texture, the controller configured to generate a control signal to cause rotation of the wheel and movement of the material across a surface of the first bony member.

14. The system of claim 1, further comprising an electrode supported on the mount, the controller configured to generate a control signal to cause delivery of current from the electrode to the first bony member.

15. The system of claim 1, further comprising a needle supported on the mount and a linear actuator coupled to the needle, the controller configured to generate a control signal used to control the linear actuator and the position of the needle relative to the first bony member.

16. A system for transmitting signals between a body of a living being and a virtual reality space, comprising:
   a mount configured to be affixed to a first bony member of the body on a distal side of a first joint;
   a base configured to be affixed to a second bony member of the body on a proximal side of the first joint;
   an elongate, flexible strip affixed at a first end to the mount and at a second end to the base;
   a first pulley mounted on the base, the strip wound about the first pulley;
   a sensor disposed on the base and configured to generate a displacement signal indicative of displacement of the strip in response to movement of the first bony member relative to the second bony member, wherein the sensor comprises a rotary potentiometer configured to rotate with the first pulley;
   a display; and,
   a controller configured to receive the displacement signal and to control movement of a virtual representation of the body on the display responsive to the displacement signal.

17. The system of claim 16, further comprising a second pulley mounted on the base coaxially with the first pulley, the strip wound about the second pulley.

18. The system of claim 16, further comprising a brake disposed on the base, the controller configured to generate a brake control signal to actuate the brake and prevent rotation of the first pulley to thereby prevent displacement of the strip.

19. The system of claim 16, further comprising a motor disposed on the base, the controller configured to generate a motor control signal to activate the motor and cause rotation of the first pulley and cause displacement of the strip.

20. A system for transmitting signals between a body of a living being and a virtual reality space, comprising:
   a mount configured to be affixed to a first bony member of the body on a distal side of a first joint;
   a base configured to be affixed to a second bony member of the body on a proximal side of the first joint;
   an elongate, flexible strip affixed at a first end to the mount and at a second end to the base;
   a first pulley mounted on the base, the strip wound about the first pulley;
   a sensor disposed on the base and configured to generate a displacement signal indicative of displacement of the strip in response to movement of the first bony member relative to the second bony member, wherein the first pulley includes a scale and the sensor comprises a rotary encoder configured to generate the displacement signal responsive to the scale;
   a display; and,
   a controller configured to receive the displacement signal and to control movement of a virtual representation of the body on the display responsive to the displacement signal.

21. The system of claim 20, further comprising a second pulley mounted on the base coaxially with the first pulley, the strip wound about the second pulley.

22. The system of claim 20, further comprising a brake disposed on the base, the controller configured to generate a brake control signal to actuate the brake and prevent rotation of the first pulley to thereby prevent displacement of the strip.

23. The system of claim 20, further comprising a motor disposed on the base, the controller configured to generate a motor control signal to activate the motor and cause rotation of the first pulley and cause displacement of the strip.

* * * * *

UNITED STATES PATENT AND TRADEMARK OFFICE
CERTIFICATE OF CORRECTION

PATENT NO. : 9,983,669 B2
APPLICATION NO. : 15/203970
DATED : May 29, 2018
INVENTOR(S) : Gangming Luo and Jonathan J. Kaufman Page 1 of 1

It is certified that error appears in the above-identified patent and that said Letters Patent is hereby corrected as shown below:

In the Claims

In Column 10, Line 13 (Claim 1), "would" should read "wound".

Signed and Sealed this
Seventeenth Day of July, 2018

Andrei Iancu
*Director of the United States Patent and Trademark Office*